United States Patent
Miliefsky

(10) Patent No.: US 9,942,269 B2
(45) Date of Patent: Apr. 10, 2018

(54) EFFECTIVELY PREVENTING DATA LEAKAGE, SPYING AND EAVESDROPPING THROUGH A NETWORKED COMPUTING DEVICE BY CONTROLLING ACCESS TO A PLURALITY OF ITS DEVICE INTERFACES

(71) Applicant: NETSHIELD Corporation, Nashua, NH (US)

(72) Inventor: Gary S. Miliefsky, Nashua, NH (US)

(73) Assignee: NETSHIELD Corportation, Nashua, NH (US)

( * ) Notice: Subject to any disclaimer, the term of this patent is extended or adjusted under 35 U.S.C. 154(b) by 0 days.

(21) Appl. No.: 14/285,769

(22) Filed: May 23, 2014

(65) Prior Publication Data

US 2014/0359768 A1    Dec. 4, 2014
US 2017/0324775 A9    Nov. 9, 2017

Related U.S. Application Data

(63) Continuation of application No. 13/904,547, filed on May 29, 2013, now abandoned.

(Continued)

(51) Int. Cl.
```
G06F 17/30     (2006.01)
H04L 29/06     (2006.01)
H04L 12/26     (2006.01)
```

(52) U.S. Cl.
CPC ...... H04L 63/1475 (2013.01); H04L 43/0817 (2013.01); H04L 63/1416 (2013.01); H04L 63/20 (2013.01)

(58) Field of Classification Search
CPC ............. H04L 63/1416; H04L 63/1408; H04L 63/145; H04L 63/1441; H04L 63/1458;

(Continued)

(56) References Cited

U.S. PATENT DOCUMENTS 5,671,442 A    9/1997  Feeney et al.
6,189,050 B1 *  2/2001  Sakarda ..................... 710/18

(Continued)

FOREIGN PATENT DOCUMENTS

EP    1655899 A1    5/2006
EP    1890427 B1    10/2009

(Continued)

OTHER PUBLICATIONS

SECUDRIVE Device Control Enterprise manual, Brainzsquare, Jul. 12, 2012, http://download.secudrives.com/sddce/1.0/kr/sddce20.pdf, see pp. 3-4, 8, 15, 18-19.

(Continued)

*Primary Examiner* — Mohammed Waliullah
(74) *Attorney, Agent, or Firm* — Finch & Maloney PLLC

(57) ABSTRACT

A computer implemented method for detecting, alerting and blocking data leakage, eavesdropping and spyware in one or more networked computing devices includes providing a graphical user interface (GUI) and displaying all available hardware device interfaces in each networked computing device. Next, providing a turn-on switch and a turn-off switch for each displayed hardware device interface in each networked computing device. Next, providing a turn-all-on switch and a turn-all-off switch for all displayed hardware device interfaces in each networked computing device. Next, monitoring status of each available hardware device interface and data traffic across each available hardware device interface. Upon detecting an unauthorized change of status of a specific hardware device interface or unauthorized data traffic across a specific hardware device interface providing a warning signal, turning off the specific hardware device interface by activating the turn-off switch for the specific hardware device interface or the turn-all-off switch.

22 Claims, 9 Drawing Sheets

Related U.S. Application Data

(60) Provisional application No. 61/729,202, filed on Nov. 21, 2012.

(58) Field of Classification Search
CPC ......... H04L 63/10; H04L 63/14; H04L 63/20; G06F 21/56; G06F 21/566; G06F 21/564; G06F 21/562; G06F 21/604; G06F 21/62; H04W 12/00; H04W 12/08; H04W 12/12
USPC .................. 726/22–33, 11–13; 455/411, 410
See application file for complete search history.

(56) References Cited

U.S. PATENT DOCUMENTS

| | | | |
|---|---|---|---|
| 6,314,409 B2 * | 11/2001 | Schneck ........................ 380/259 |
| 7,310,664 B1 * | 12/2007 | Merchant ............ H04L 41/0886 709/220 |
| 7,353,538 B2 * | 4/2008 | Sample ............................ 726/23 |
| 7,424,030 B2 | 9/2008 | Subramanian et al. |
| 7,739,693 B2 | 6/2010 | Bernhard et al. |
| 8,140,664 B2 | 3/2012 | Huang et al. |
| 8,271,642 B1 * | 9/2012 | Sankararaman et al. ..... 709/224 |
| 8,554,748 B1 * | 10/2013 | Kamity ............... G06F 9/44578 707/634 |
| 8,566,924 B2 * | 10/2013 | Bacastow ........................ 726/20 |
| 8,590,033 B2 * | 11/2013 | Schleiss et al. ................. 726/13 |
| 8,595,489 B1 * | 11/2013 | Faaborg ................ H04W 12/02 713/166 |
| 8,650,620 B2 | 2/2014 | Chawla et al. |
| 9,208,349 B1 | 12/2015 | Miliefsky et al. |
| 2003/0051169 A1 * | 3/2003 | Sprigg .................... G06F 9/468 726/4 |
| 2003/0084340 A1 | 5/2003 | Schertz et al. |
| 2003/0131256 A1 * | 7/2003 | Ackroyd ............... G06F 21/552 726/23 |
| 2004/0003290 A1 * | 1/2004 | Malcolm ............... H04L 63/029 726/14 |
| 2005/0005169 A1 * | 1/2005 | Kelekar .............. H04L 63/1408 726/4 |
| 2006/0200471 A1 * | 9/2006 | Holland .................. H04L 12/24 |
| 2006/0253712 A1 * | 11/2006 | Armingaud et al. ......... 713/189 |
| 2007/0038997 A1 | 2/2007 | Grobman et al. |
| 2007/0199075 A1 | 8/2007 | Skoric et al. |
| 2009/0106834 A1 * | 4/2009 | Borzycki et al. ............... 726/21 |
| 2009/0265754 A1 | 10/2009 | Hinds |
| 2010/0197290 A1 * | 8/2010 | Luzzatto .............. H04B 1/3838 455/418 |
| 2011/0138186 A1 * | 6/2011 | Jourdain et al. .............. 713/182 |
| 2011/0239306 A1 | 9/2011 | Avni et al. |
| 2012/0054868 A1 * | 3/2012 | Ramalingam ........... G06F 21/52 726/24 |
| 2012/0110666 A1 | 5/2012 | Ogilvie |
| 2012/0159578 A1 * | 6/2012 | Chawla et al. .................... 726/4 |
| 2012/0222120 A1 * | 8/2012 | Rim ....................... G06F 21/566 726/24 |
| 2012/0240236 A1 * | 9/2012 | Wyatt ................... G06F 21/564 726/25 |
| 2012/0317609 A1 * | 12/2012 | Carrara ............... G06F 21/6218 726/1 |
| 2013/0054962 A1 * | 2/2013 | Chawla et al. ............... 713/156 |
| 2013/0055347 A1 * | 2/2013 | Chawla ................ H04W 12/08 726/3 |
| 2013/0212677 A1 | 8/2013 | Wurster |
| 2013/0297836 A1 * | 11/2013 | Bhesania et al. ............... 710/19 |

FOREIGN PATENT DOCUMENTS

| | | |
|---|---|---|
| WO | 2013022655 A1 | 2/2013 |
| WO | 2014154323 A1 | 10/2014 |

OTHER PUBLICATIONS

Cisco adaptive security device manager version 5.2 Data Sheet, Cusco Systems, Inc. 2008, http://www.cisco.com/c/en/us/products/collateral/security/pix-500-series-security-appliances/product_data_sheet0900aecd804ba978.pdf, see pp. 1-2.

PCT Search Report and Written Opinion for PCT Application No. PCT/US2016/013155, dated Apr. 19, 2016, 13 pages.

International Search Report and Written Opinion received for PCT Application No. PCT/US2013/043240. dated Sep. 6, 2013. 15 pages.

Liang, Cai et al., "Defending Against Sensor-Sniffing Attacks on Mobile Phones", MobiHeld'09, Aug. 2009, pp. 31-36.

* cited by examiner

| App | Access | Mic | BT | GPS | USB | IR | WiFi | Camera | Phone |
|---|---|---|---|---|---|---|---|---|---|
| Angry Birds | Yes | No | No | No | No | No | No | No | No |
| Power Amp | No | No | No | No | No | No | No | No | No |
|  |  |  |  |  |  |  |  |  |  |

EFFECTIVELY PREVENTING DATA LEAKAGE, SPYING AND EAVESDROPPING THROUGH A NETWORKED COMPUTING DEVICE BY CONTROLLING ACCESS TO A PLURALITY OF ITS DEVICE INTERFACES

CROSS REFERENCE TO RELATED CO-PENDING APPLICATIONS

This application is a continuation application of, and claims the benefit of, U.S. patent application Ser. No. 13/904,547 filed on May 29, 2013 and entitled "System and method for detecting, alerting and blocking data leakage, eavesdropping and spyware," which is commonly assigned and claims the benefit of U.S. provisional application Ser. No. 61/729,202, filed on Nov. 21, 2012, the entire contents of all of which are expressly incorporated herein by reference.

FIELD OF THE INVENTION

The present invention relates to a system and method for detecting, alerting and blocking data leakage, eavesdropping and spyware in networked computing devices.

BACKGROUND OF THE INVENTION

Networked computing devices have a high risk for being attacked by malicious code for gaining remote access, eavesdropping and spying. In particular, Windows™ computing devices, iPhone™, Android™ and Windows™ Phone are incredibly high risk environments for being spied upon without the end-user's knowledge. Many search engine resulting links such as those of BING™ and of GOOGLE™ contain drive-by malware that allows for remote espionage and provides access to sensitive information stored in the networked computing devices. This unauthorized access to sensitive information provides an increased opportunity for cyber-crime. Currently available anti-virus, anti-malware, and anti-spyware applications focus on trying to detect malware based on known signatures or behavior. However, new types of malware are being developed constantly and the currently available firewall, intrusion detection, intrusion prevention, anti-virus, anti-malware, and anti-spyware applications cannot detect, prevent or react to most of the new types of malware.

In particular, none of the currently available security utilities can answer these questions: Which ports or device interfaces are open? Is the wireless port enabled? Is it connected to a network? Is the Bluetooth or Infrared Interface enabled? Is the webcam on? Is the universal serial bus (USB) port enabled? Is the microphone on? Some of the currently available security applications come with keylogger detection utilities. However, there are no guarantees that these applications will also stop keyboard eavesdropping. Most users want SKYPE™ and Microsoft instant messaging (IM) on in order to be able to communicate and therefore numerous communication ports remain open. Malware may use these open ports to phone home to callback uniform resource locators (URLs). Spyware may use these open ports to send eavesdropping information to those who are maliciously eavesdropping, unbeknownst to the victim or the plethora of security utilities.

Accordingly, there is a need for improved systems and methods for detecting, alerting and blocking data leakage, eavesdropping and spyware in networked computing devices.

SUMMARY OF THE INVENTION

This present invention provides a system and method for detecting, alerting and blocking data leakage, eavesdropping and spyware in networked computing devices.

In general, in one aspect the invention provides a computer-implemented method for detecting, alerting and blocking data leakage, eavesdropping and spyware in one or more networked computing devices. The method includes providing a graphical user interface (GUI) and displaying all available hardware device interfaces in each networked computing device. Next, providing a turn-on switch and a turn-off switch for each displayed hardware device interface in each networked computing device. Next, providing a turn-all-on switch and a turn-all-off switch for all displayed hardware device interfaces in each networked computing device. Next, monitoring status of each available hardware device interface and data traffic across each available hardware device interface. Upon detecting an unauthorized change of status of a specific hardware device interface or unauthorized data traffic across a specific hardware device interface providing a warning signal, turning off the specific hardware device interface by activating the turn-off switch for the specific hardware device interface or the turn-all-off switch.

Implementations of this aspect of the invention may include one or more of the following features. Upon resolving the unauthorized change of status of the specific hardware device interface or unauthorized data traffic across the specific hardware device interface, turning on the specific hardware device interface by activating the turn-on switch for the specific hardware device interface or the turn-on-off switch. Activation of the turn-on, turn-off, turn-all-on, turn-all-off switches is initiated locally by a user of the networked computing device, or remotely by an administrator of the networked computing device. The networked computing device includes a central processing unit (CPU), a security application, and a display. The security application provides computer implemented operations and instructions that monitor, detect and block data leakage, eavesdropping and spyware across all available hardware device interfaces in each of the networked computing device. The CPU executes the computer implemented instruction provided by the security application, and the display displays the GUI. The method further includes providing a first table comprising a list of applications and authorized status of each available hardware device interface for each application and storing the first table in a database. The method further includes providing a second table comprising a list of known malicious applications and storing the second table in the database. The method further includes providing a server configured to access the one or more networked computing devices via a network connection. The server comprises a command center, a dashboard, a toolbar, a taskbar, a stand-alone GUI and an application programmer's interface (API). The command center is configured to manage remotely security applications in the one or more networked computing devices. The method further includes creating rules and policies and installing them in the security applications of the one or more networked computing devices and the server via the command center. The method further includes summarizing and presenting in the dashboard real-time events occurring in the one or more networked computing devices and the server. The method further includes displaying the status of all available hardware device interfaces in the toolbar for the one or more networked computing devices and the server.

Communications between the server and the one or more networked computing devices comprise secure communications protocols. The secure communication protocols comprise one of secure socket layer (SSL), or transport layer security (TLS). The server further comprises a real-time kernel driver and a rootkit 'system' healer. The real-time kernel constantly monitors the status of all controlling interfaces and settings and in the event a hacker or malicious code tampers with the security applications, the rootkit "system" healer restores the security applications. The available hardware device interfaces may be a keyboard, mouse, touchscreen, webcam, USB hardware device interface, microphone, Flash memory, Infrared, Bluetooth, Ethernet, Wireless, LAN, WAN, VPN, text messaging interfaces, telephone interfaces, modem, cellular, GPS interfaces, gesture based interfaces or eye-motion based interfaces. The turn-on, turn-off, turn-all-on, turn-all-off switches comprise slidably activated switches, or comprise pressure-activated switches. The networked computing devices may be personal computers, servers, desktops, laptops, mobile phones, iPhones™, iPads™, iTouches™, Droids™, Blackberry™ devices, Windows™ phone, Android™ phones, personal digital assistants (PDAs), or tablet devices. The warning signal may be a visual warning signal or an acoustical warning signal. The visual warning signal comprises flashing of the specific hardware device interface image in the GUI. The method further includes, prior to installing a new application in any of the one or more networked computing devices, sending a message comprising the hardware device interfaces to which the new application requests access and asking for installation permission and which hardware device interfaces should be blocked.

In general, in another aspect, the invention features a system for detecting, alerting and blocking data leakage, eavesdropping and spyware in one or more networked computing devices including a graphical user interface (GUI) displaying all available hardware device interfaces in each networked computing device, a turn-on switch and a turn-off switch for each displayed hardware device interface in each networked computing device, a turn-all-on switch and a turn-all-off switch for all displayed hardware device interfaces in each networked computing device, and a security application. The security application is configured to monitor status of each available hardware device interface and data traffic across each available hardware device interface, and upon detecting an unauthorized change of status of a specific hardware device interface or unauthorized data traffic across a specific hardware device interface providing a warning signal and turning off the specific hardware device interface by activating the turn-off switch for the specific hardware device interface or the turn-all-off switch.

In general, in another aspect, the invention features a computer program product for detecting, alerting and blocking data leakage, eavesdropping and spyware in one or more networked computing devices. The computer program product is stored on a computer readable medium and includes computer code for providing a graphical user interface (GUI) and displaying all available hardware device interfaces in each networked computing device, computer code for providing a turn-on switch and a turn-off switch for each displayed hardware device interface in each networked computing device, computer code for providing a turn-all-on switch and a turn-all-off switch for all displayed hardware device interfaces in each networked computing device, computer code for monitoring status of each available hardware device interface and data traffic across each available hardware device interface, computer code for providing a warning signal, upon detecting an unauthorized change of status of a specific hardware device interface or unauthorized data traffic across a specific hardware device interface and computer code for turning off the specific hardware device interface by activating the turn-off switch for the specific hardware device interface or the turn-all-off switch.

Among the advantages of this invention may be one or more of the following. The present invention broadly monitors and protects all the high-risk hardware device ports and interfaces that are accessible by both the end-user and software applications, including modern malware.

The Snoopwall technology of the present invention complements prior art security applications, which usually monitor network traffic across network traffic ports. Network traffic ports may be opened for allowing Internet communications. In one example, port 80 is opened for allowing World Wide Web communications via the hypertext transfer protocol (HTTP). In another example, port 21 is opened for allowing file transfers via the file transfer protocol (FTP). Prior art security applications focus on monitoring these network traffic ports for malicious traffic and review packets of data traveling over these network traffic ports. The Snoopwall technology of the present invention does not need to eavesdrop on any network traffic packets or data as it is designed to monitor access to the actual Ethernet hardware device ports and to alert end-users about any new attempted access to these hardware device ports. The Snoopwall technology of the present invention does not need any information or frequent updates about the types of traffic that may flow across the many (up to 65535) network traffic ports using many different protocols. Therefore, the Snoopwall technology of the present invention complements prior art security applications and techniques and provides a more efficient method of blocking access to the network through the actual hardware device interface ports such as Ethernet, Wireless Ethernet, among others.

The Snoopwall technology of the present invention is focused on the root cause of data leakage, i.e., access to the high-risk hardware interface ports, while prior art security applications focus on detecting the signatures of the malware payload or the malware behavior. Therefore, the Snoopwall technology of the present invention is applicable against any type of malware including new or not yet detected types of malware, whereas the prior art security applications are applicable only to already known malware. In particular, the Snoopwall technology of the present invention is applicable against advanced persistent threats (APTs) malware, which is malware that is nearly impossible to detect or remove. The Snoopwall technology of the present invention is also applicable against zero-day (0-day) or other new forms of malware. As the Snoopwall technology of the present invention focuses on the management of the high-risk hardware interface ports, it will not require any updates for malware signatures or malware behavioral heuristics. The only necessary updates for the Snoopwall technology to properly secure an end-user environment would be only when new high-risk hardware interface ports are created, which is a very infrequent event. This is not only uniquely complementary to existing security utilities, it is a completely radical approach—focusing on the areas where data is leaked from, instead of focusing on the detection of each possible piece of new malware being delivered to the end-user system in some form of payload or application.

DETAILED DESCRIPTION OF THE INVENTION

In general, the present invention relates to eavesdropping and spyware blocking technology, and more specifically it relates to systems and methods for blocking data leakage, eavesdropping and spyware technology in networked devices by controlling access to various high-risk data ports or hardware device interfaces. These high risk ports include Webcam, USB, Microphone, Flash Memory, Infrared, Bluetooth, Wireless, LAN, WAN, VPN, Cellular and GPS interfaces, among others.

Figure 1:
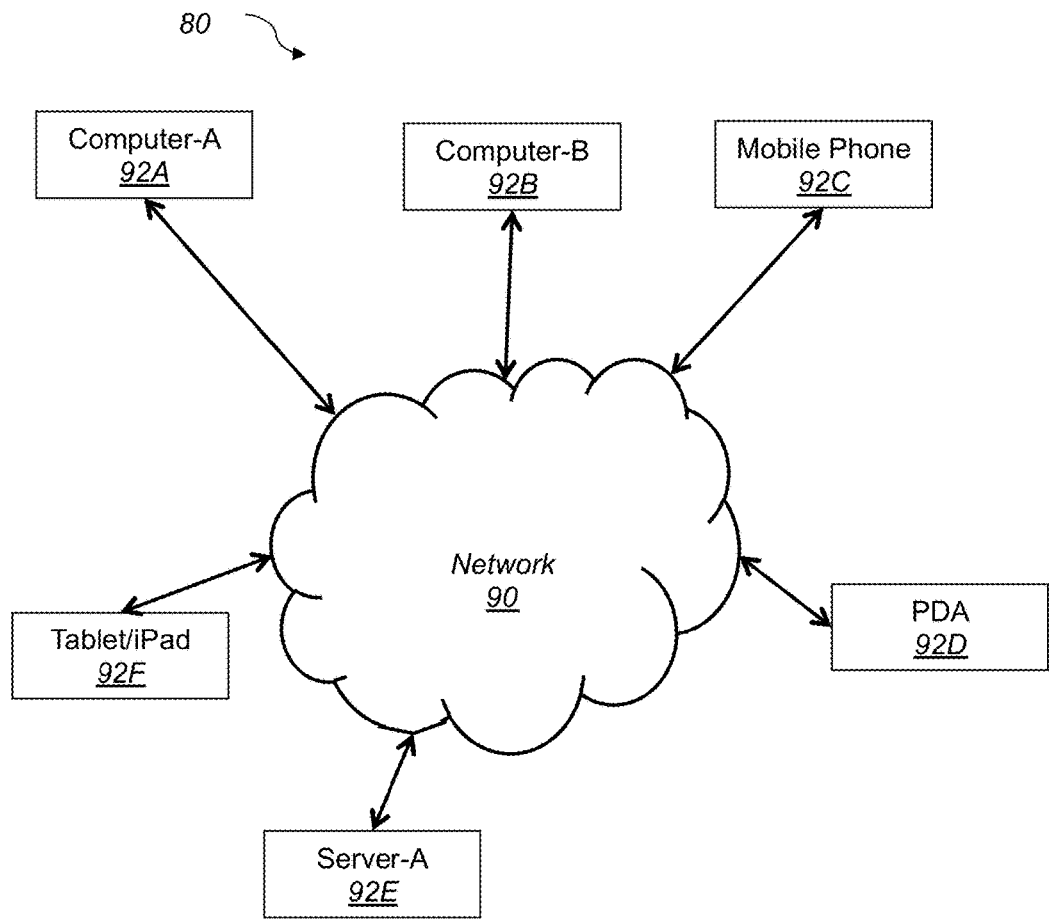
FIG. 1 is a schematic diagram of the network architecture of a system 80 for blocking data leakage, eavesdropping and spyware applications according to this invention.

Referring to FIG. 1, a client-server system 80 for blocking data leakage, eavesdropping and spyware applications according to one embodiment of this invention includes computing devices 92A, 92B, mobile communication devices 92C, personal digital assistant devices 92D, Tablet/iPad™ device 92F and a server 92E. Devices 92A, 92B, 92C, 92D, 92F are connected to each other and to the server 92E via a network 90. In other embodiments, system 80 includes additional computing devices including personal computers, servers, desktops, laptops, iPhones, iPads, iTouches, Droids, Blackberry devices, Windows phone, Android phones, or other tablet devices, among others.

Figure 2:
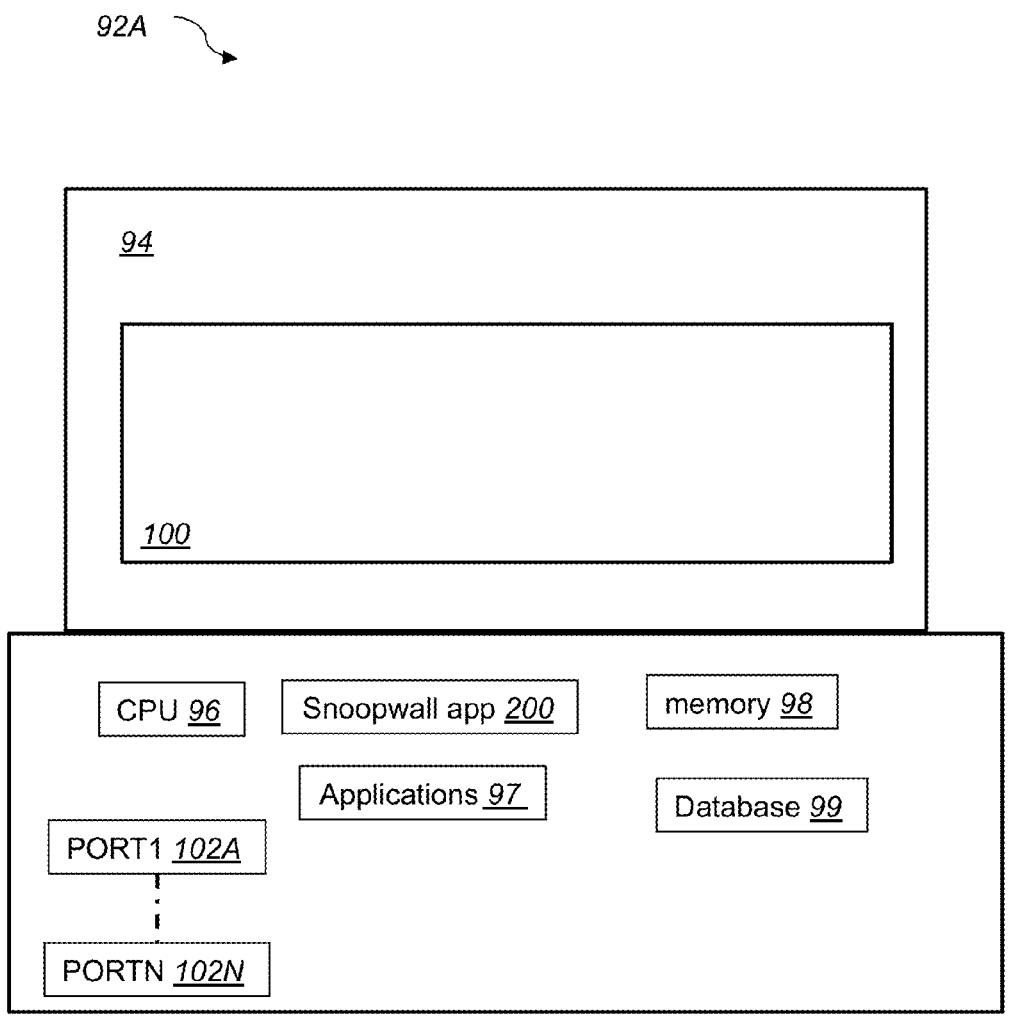
FIG. 2 is a schematic diagram of the computing device 92A of FIG. 1.
Figure 9:
FIG. 9 depicts a table used to set permissions and denials for specific applications.

In one example, networked computing device 92A includes a central processing unit (CPU) 96, software applications 97, access ports (or hardware device interfaces) 102A - - - 102N, memory 98, database 99, a Snoopwall application 200, and a display 94, as shown in FIG. 2. The Snoopwall application 200 provides computer implemented operations and instructions that monitor, detect and block data leakage, eavesdropping and spyware of the computing device 92A. In particular, application 200 provides functionalities for monitoring, detecting and blocking data leakage and eavesdropping in the data stored in database 99, memory 98, and in operations executed by the CPU 96. These functionalities include monitoring information flow across all ports 102A . . . 102N and closing of selected ports when data leakage, eavesdropping or spyware are detected. Snoopwall application 200 also presents a graphical user interface (GUI) 100, as shown displayed in display 94 of FIG. 2. Database 99 includes a list of applications 300 and information whether each application is allowed to run on the specific computing device and to which ports of the computing device should have access, as shown in FIG. 9. The user of the computing device 92A and the administrator of the client-server system 80 are allowed to manually enter permissions and denials of applications in list 300 and set access to specific ports and store the information in database 99. Database 99 also stores a list of known malicious applications that should not be allowed to run on the computing device or have access to any or specific ports.

Snoopwall application 200 also reviews each application prior to installing or running it on a device and determines the associated application unique signature and the requests for access to the high-risk access ports by the application. Application 200 stores this information in the database 99 and informs the user of the application prior its installation. In one example, the application ANGRYBIRDSFORAPPLE.exe is downloaded to a Windows™ iTunes™ platform and the Snoopwall application 200 reviews the downloaded file to determine which device ports the downloaded application tries to access. It was found that the ANGRYBIRDSFORAPPLE.exe application tries to access the GPS, USB, Bluetooth, Internet, webcam and microphone, whereas the ANGRYBIRDSFORAPPLE.exe application is not supposed to have access to these hardware device ports. This information is stored in the database 99 in the list of applications and is shared and communicated to all end-users. When users try to install the ANGRYBIRDSFORAPPLE.exe application in their iPad™ tablet, the Snoopwall application 200 sends out a message to them informing them that the application they want to install tries to access the above mentioned device ports and asks them if they really want to install this application and if they want to block access of the application to any or all of the above mentioned device ports.

Figure 3:
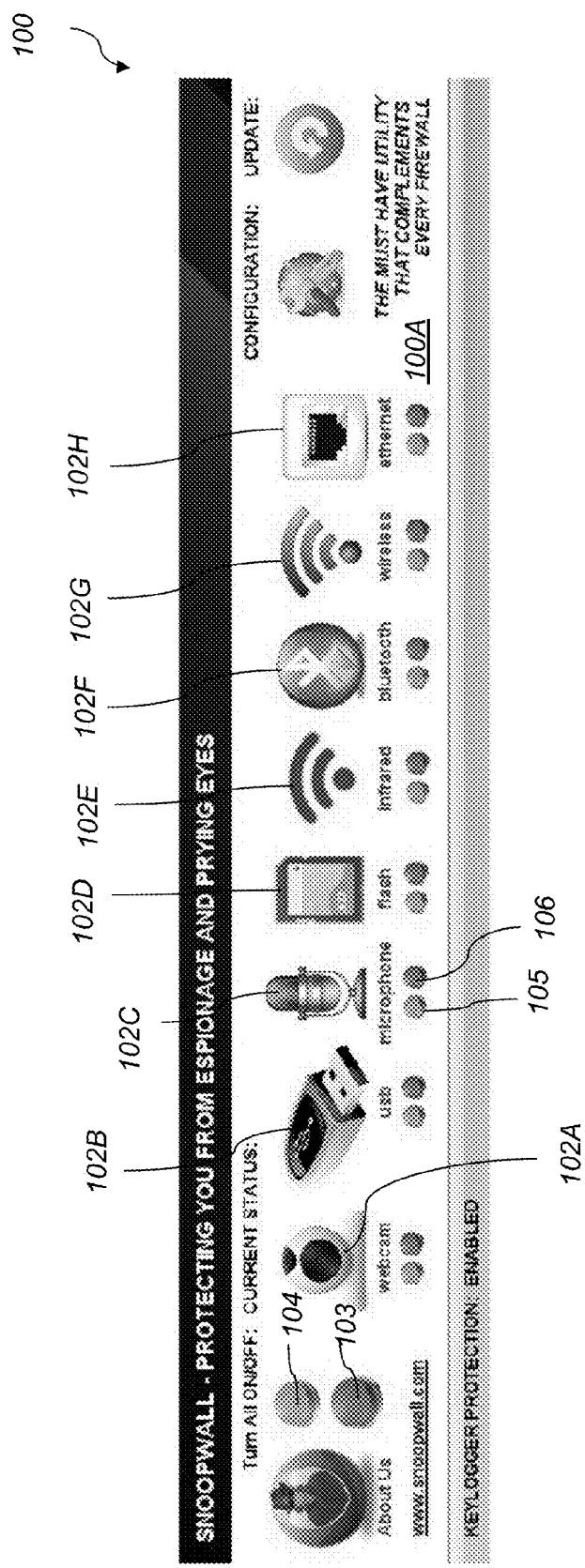
FIG. 3 is a schematic diagram of one embodiment of a graphical user interface (GUI) 100 used in the computing device 92A of FIG. 2.

Referring to FIG. 3, GUI 100 displays in real time the status of all access ports (or hardware device interface) 102A . . . 102N. In the example of FIG. 3, ports 102A . . . 102N, are arranged linearly within a toolbar 100A. In other examples, ports 102A . . . 102N are depicted in other geometric arrangements including vertical arrangements, horizontal arrangements, circular arrangements, or along any other geometric or random configuration. Examples of access ports include Webcam 102A, USB port 102B, Microphone 102C, Flash Memory 102D, Infrared 102E, Bluetooth 102F, Wireless 102G, LAN, WAN, VPN, Cellular and GPS interfaces 102H, keyboard, mouse, touchscreen, Ethernet, text messaging interfaces, telephone interfaces, modem, gesture based interfaces, eye-motion based interfaces, or other enhanced input/output (i/o) interfaces, among others. GUI 100 also displays a Turn-All-ON button 104, a Turn-All-OFF button 103 and port specific On and Off buttons 105, 106.

When data leakage, eavesdropping or spyware software are detected in any of ports 102A . . . 102N, the port turns red, flashes and sends an acoustical warning signal. The user has the option to turn off manually the specific port by activating the corresponding Off button 106 in order to block the detected data leakage, eavesdropping or spyware software. The user has also the option to turn off manually all access ports by activating the Turn-All-OFF button 103. The ports may be enabled when the problem has been resolved by activating either the Turn-All-ON button 104 or the port specific On button 105. The system also provides automatic turning Off of all ports or specific ports when data leakage, eavesdropping or spyware software are detected in any of ports 102A . . . 102N. The system also provides automatic turning ON of all ports or specific ports when the problem is resolved.

System 80 also includes Client-Server capabilities to allow information technology managers to control remotely any or al of the above mentioned ports in any or all of the individual devices 92A, 92B, 92C, 92D, 92F from server 92E. These Client-Server capabilities provide real-time manual, semi-automatic and automatic detection, alerting, blocking and controlling access to various high-risk data ports in cases when data leakage, eavesdropping and spyware applications are detected.

Figure 4:
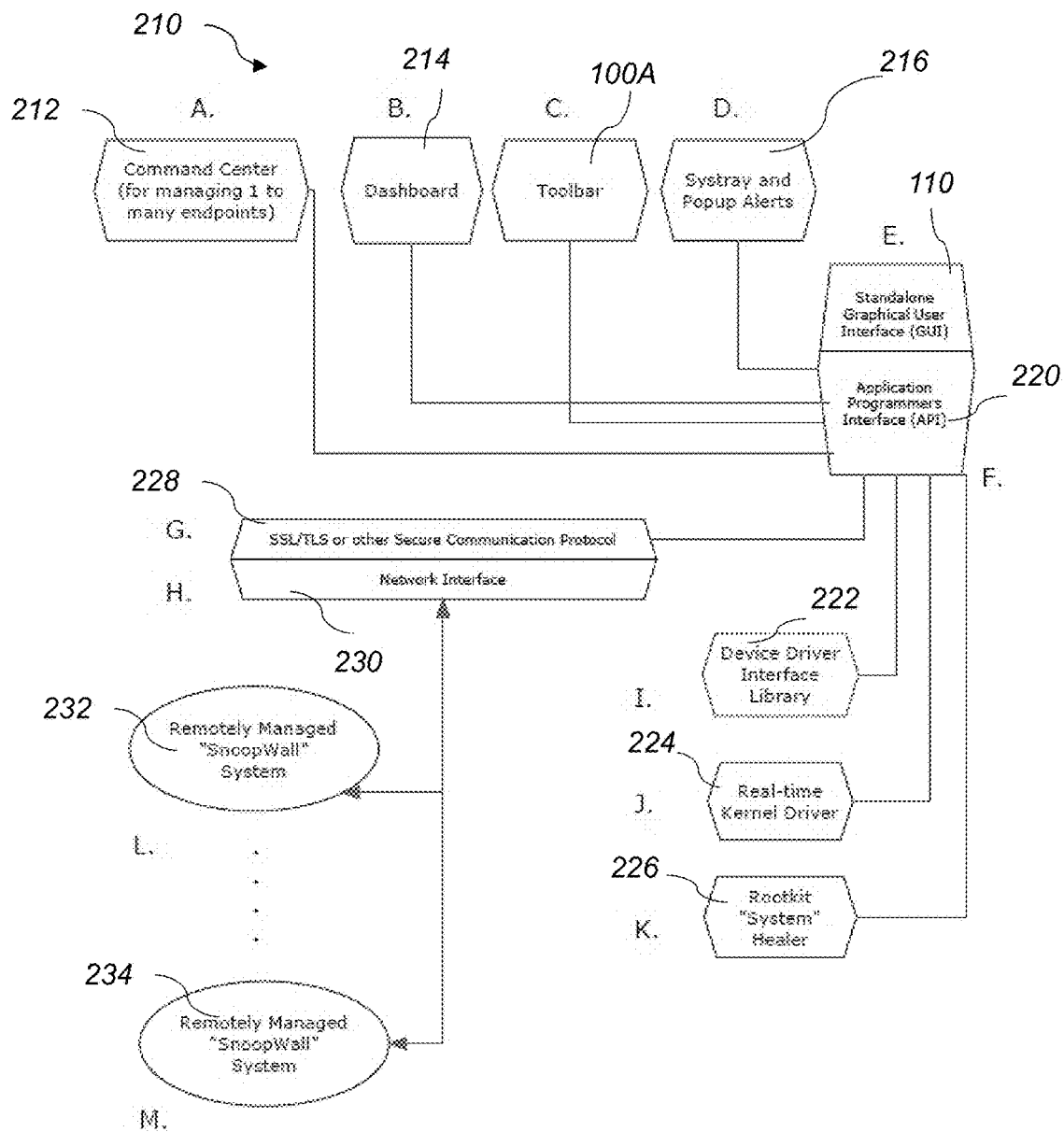
FIG. 4 is a block diagram of the components of system 80 of FIG. 1.

Referring to FIG. 4, the management interface for client-server system 80 includes a command center 212, a dashboard 214, a toolbar 100A, a taskbar or systray and popup alerts 216, standalone GUI 110, application programmers interface (API) 220, secure communication protocol 228, network interface 230, device driver interface library 222, real-time kernel driver 224, Rootkit "system healer" 226, and remotely managed "Snoopwall" systems 232, 234.

In the example of FIG. 1, command center 212 runs in the administrator's computing device (i.e., server-A 92E) and is used for managing the Snoopwall security utilities running in the remote system endpoints 232, 234 of the networked computing devices 92A, 92B, 92C, 92F, as well as the Snoopwall security utilities running in the administrator's computing device 92E. Command center 212 helps create rules and policies in groups and roll them out to the Snoopwall security utilities running in the one or more remote system endpoints as well as to the Snoopwall security utilities running on the administrator's computing device. Dashboard 214 summarizes real-time events from one or more remote system endpoints 232, 234 as well as real-time events running on the administrator's system. Toolbar 100A allows configuration changes and alerts through a simple graphical user interface (GUI), as shown in FIG. 3. Toolbar 100A can also be minimized to be a Taskbar or Systray 216 until the user interacts with the system or when events occur requiring Popup Alerts.

Standalone GUI 110 provides the system core functionalities to the standalone computing devices 92A, 92B, 92C, 92D, 92F. These core functionalities include obtaining help, setting options, features, performing updates and other end-user functions. API 220 is accessible through secure, trusted interfaces 230, 222, 224, 226, and allows abstraction of the command center 212, dashboard 214, toolbar 100A, taskbar 216, and standalone GUI 110 to the endpoint systems 232, 234. API 220 provides flexibility in how it displays events, controls and results, while the core functionality is available through this centralized set of function calls.

The remotely managed endpoint systems 232, 234 of the computing devices 92A, 92B, 92C, 92D, 92F connect to the server 92E via a network interface 230. Secure communication protocols 228 such as secure socket layer (SSL), or transport layer security (TLS) are used in the connections and communications between the remotely managed endpoint systems 232, 234 of the computing devices 92A, 92B, 92C, 92D, 92F and the server 92E. Core functionality exposed by the API 220 is derived from the device driver interface library 222 to manage Webcam 102A, USB port 102B, Microphone 102C, Flash Memory 102D, Infrared 102E, Bluetooth 102F, Wireless 102G, LAN, WAN, VPN, Cellular and GPS interfaces 102H, and to ensure that control is not subverted by a hacker or malicious software. Real-time kernel driver 224 constantly monitors the status of the controlling interface and settings and in the event a hacker or malicious code are able to tamper with the "Snoopwall" application, a Rootkit "system" healer 226 is installed to capture these rare but high risk events and thereby to restore the "Snoopwall" application and to block data leakage.

In the standalone configuration, the Snoopwall client application 200 depicts all available ports in the standalone GUI 110 and provides visual alerts about each high-risk data leakage port's state, i.e., whether it is open or closed or if there is an attempt to open one of these ports. If a port is opened and unauthorized data transfer is detected across this port, the GUI shows a flashing icon of this port. In other embodiments, an acoustical warning signal is also sent. The user of the device and/or the remote administrator have the ability to enable or disable any or all of the displayed high-risk ports. As was mentioned above, these high-risk ports include Webcam 102A, USB port 102B, Microphone 102C, Flash Memory 102D, Infrared 102E, Bluetooth 102F, Wireless 102G, LAN, WAN, VPN, Cellular and GPS interfaces 102H. In the case of the keyboard being attacked, the functionality of the keyboard is not disabled while the keyboard is protected against keyloggers. In the case when the USB port is being eavesdropped, the USB port is disabled while the keyboard and mouse devices remain operational. In addition, password and/or token access can be enabled as an additional security option so that no third-party can take over a high-risk data leakage port without being prompted for a password or token.

Configuration options allow for an auto-shutoff interval to be set on one or more selected high-risk data leakage ports, an auto-alert interval and method such as popup window or email, password, token and proxy server settings as well as update server information. The Snoopwall application 200 may be written using any programming language, including C, C++, Java with database interfaces into a Structured Query Language (SQL) database and/or text files containing critical user, application and ports information, among others. However, since each Snoopwall application for each standalone device has a different GUI, Kernel, Driver, Rootkit and Secure Communication methodologies, the code of the Snoopwall application is customized to ensure it functions securely and can self-heal on any operating system (OS) including Windows™ XP, Windows™ 7, Windows™ 8, iPhone™, iPad™, iTouch™ OS Editions, Android™ OS, Linux OS, BSD, Unix, Blackberry OS, Microsoft Phone and Tablet operating systems, among others.

In the Client-Server system configuration, the Snoopwall server 92E contains all the codes of the Snoopwall clients to ensure that the local systems 92A, 92B, 2C, 92D, 92F are secure from eavesdropping. Server 92E also includes the built-in application programmers interface (API) 220, dashboard 214, command center 212, toolbar 100A, and taskbar or systray and popup alerts 216. API 220 allows for remote control, alerts and updates from Snoopwall client systems in the same WAN, LAN or multi-VLAN segments through authentication. Dashboard 214 displays in real-time the status of the ports in each Snoopwall client and which Snoopwall clients have changed their profile. Command center 212 allows making changes in single Snoopwall clients or creating groups and pushing changes to these groups. The Snoopwall Server code also includes industry standard logging using SYSLOG format about the key events of Snoopwall clients and the server itself. As was mentioned above, Snoopwall application 200 may be written using any programming language, and the code is customized so that it can run on one or more operating systems including Windows™ 2000, Windows™ NT, Windows™ XP, Windows™ 7 and Windows™ 8 as well as Linux, BSD and Unix, among others.

Figure 5:
FIG. 5-FIG. 8 depict an embodiment of a GUI, used in a mobile communication device for detecting, alerting and blocking data leakage, eavesdropping and malicious spyware.
Figure 6:
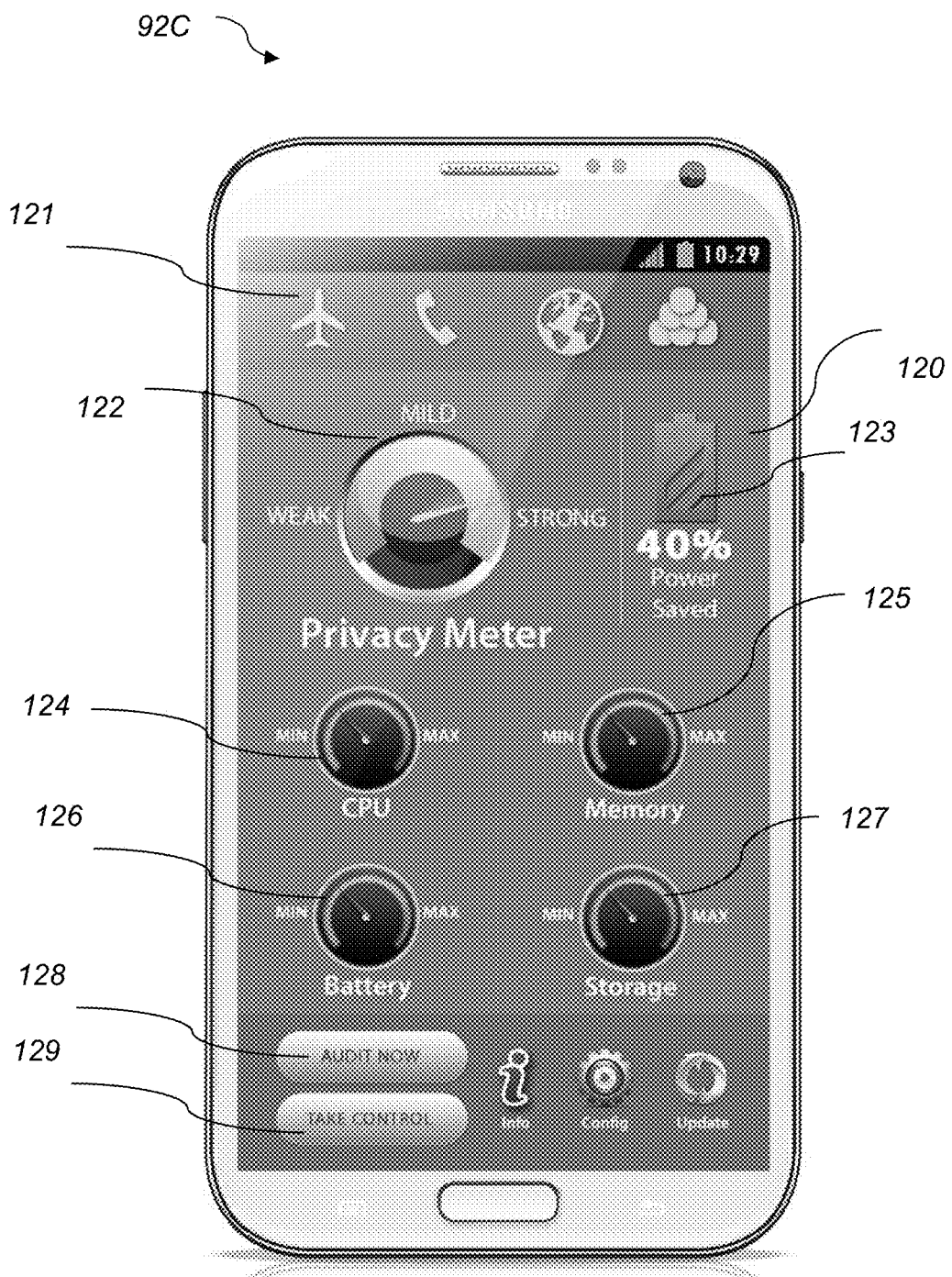
Figure 7:
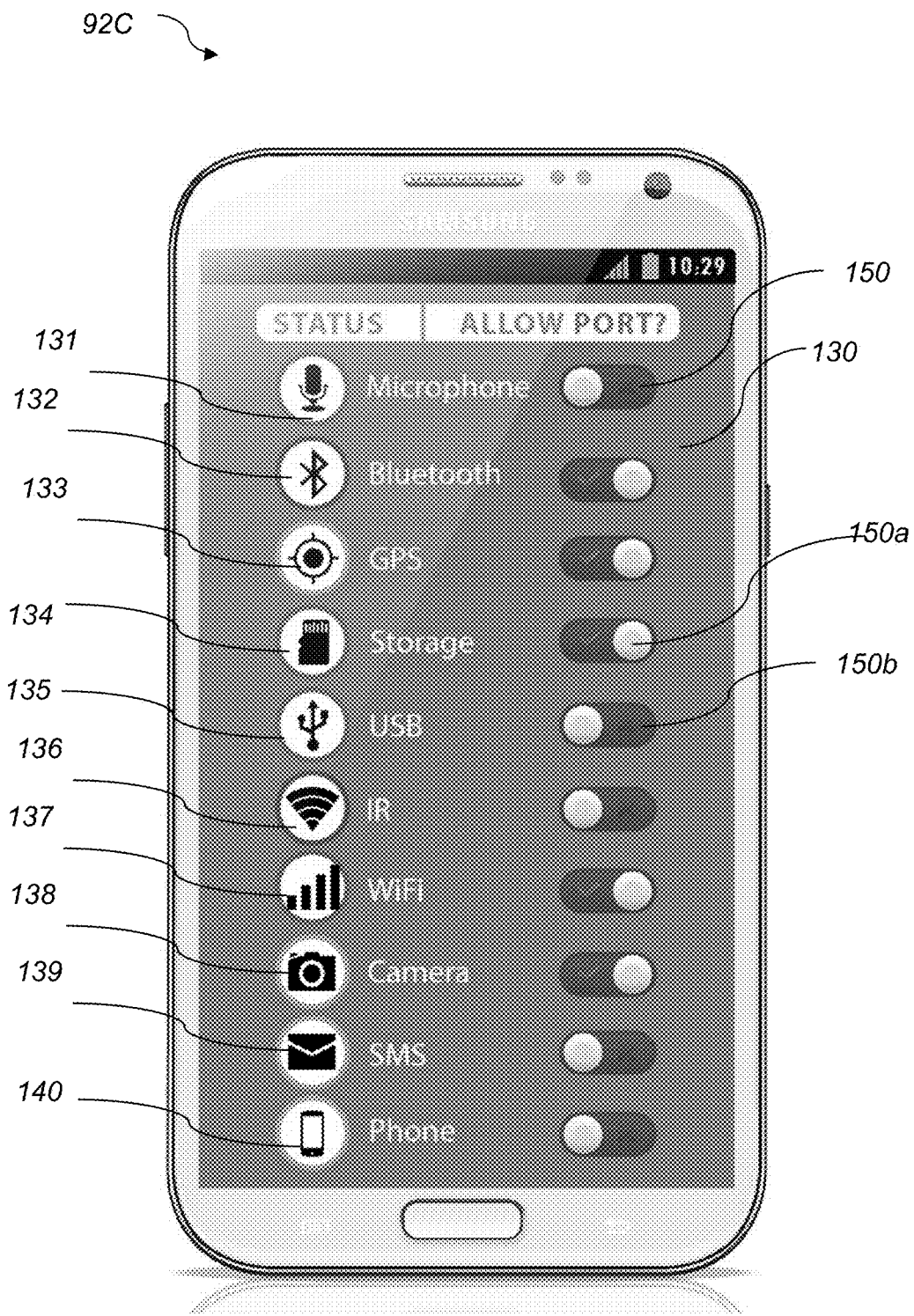
Figure 8:
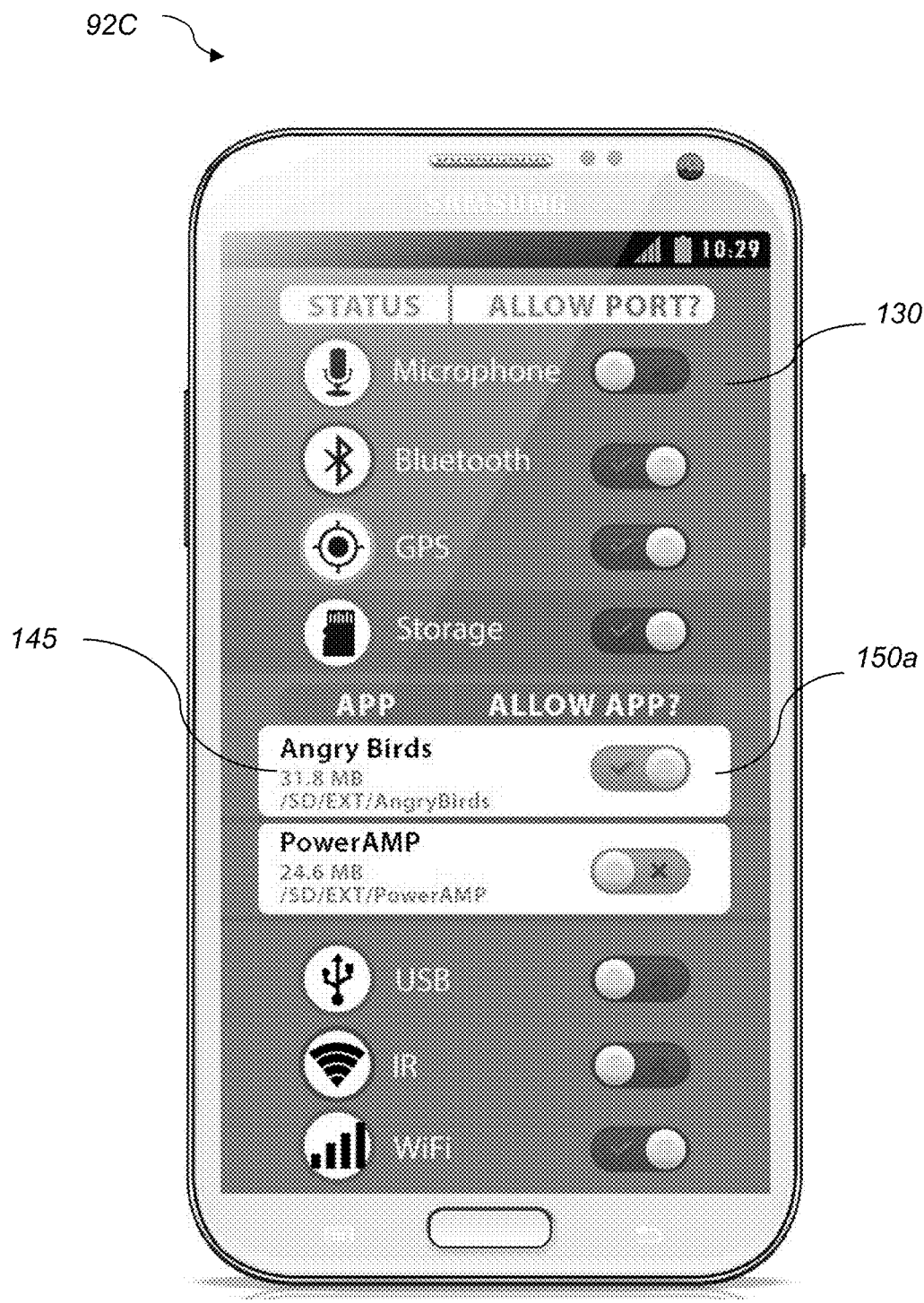

Referring to FIG. 5 and FIG. 6, Snoopwall application 200A for a mobile phone 92C includes a GUI screen 120 that depicts a privacy meter indicator 122, the amount of CPU used 124, the battery voltage used 126, the storage capacity used 127, the memory capacity used 125, and the battery power level 123. GUI 120 also includes a toolbar 121, a button for initiating a privacy audit function 128 and a take control button 129. Activating the take control button 129 presents a new GUI screen 130, shown in FIG. 7. GUI screen 130 depicts the status of all high risk ports including microphone 131, Bluetooth interface 132, GPS 133, storage 134, USB 135, Infrared interface 136, Wi-Fi interface 137, camera 138, SMS messaging port 139 and the phone port 140. Next to each port there is a slidably activated button 150 that can be set to the On position 150*a* or the Off position 150*b* and thereby to enable or disable the corresponding port. Screen 130 also includes images of the active applications 145 and allows the user to turn on or off the applications by sliding button 150 to the On position 150*a* or the Off position 150*b*, as shown in FIG. 8.

In operation, every networked computing device 92A, 92B, 92C, 92D, 92F is equipped with an anti-eavesdropping utility, i.e., a Snoopwall application 200, that complements all existing firewalls and all anti-virus programs. With the Snoopwall application 200 installed, a user can easily see which data ports are open, which ports are closed and if there is unauthorized data leakage (eavesdropping) across a port. The user receives visual alerts when there is unauthorized eavesdropping across a port and has the option to select which ports to keep open and which port to disable. Ports may be disabled completely and remain closed until the user unlocks them with a secret password. As was mentioned above, there are two versions of the Snoopwall application, the consumer (also known as the "standalone" configuration) edition and the enterprise edition (also known as the "client-server" configuration). The enterprise edition includes a command center 212, dashboard 214 and remote management API 220. Whether operating in the standalone or in the client-server configuration, the Snoopwall application enables computing device managers and owners to finally take control of these devices and truly know if there is any attempt to eavesdrop on them through high risk data leakage ports.

Several embodiments of the present invention have been described. Nevertheless, it will be understood that various modifications may be made without departing from the spirit and scope of the invention. Accordingly, other embodiments are within the scope of the following claims.

What is claimed is:

1. A computer program product for effectively preventing data leakage, spying and eavesdropping through at least one computing device coupled to a network by controlling access within the networked computing device to a plurality of hardware device interfaces, wherein said computer program product includes computer code that is stored on a non-transitory computer readable medium, the computer code capable of being accessed and executed by the networked computing device within an application layer of an operating system to perform a method for each application of a plurality of software applications to be installed or run on the networked computing device, the method comprising:

reviewing an executable file of the application prior to installing the application on the computing device to identify which of the hardware device interfaces the application is configured to access when the executable file is executed by the computing device;

sending a message prior to installing the application, the message comprising the executable-identified hardware device interfaces the application is configured to access when the executable file is executed by the computing device, asking for permission to install the application, and asking for which of the executable-identified hardware device interfaces should be blocked if the application is installed;

authorizing access to only those of the executable-identified hardware device interfaces the application should be permitted to access based on rules and policies defining a legitimate need for such access;

monitoring, within the application layer via an application program interface (API) to a device driver interface library, status of each hardware device interface of the hardware device interfaces continuously to detect an unauthorized change in the status, including an attempt to access, or a successful access of, the hardware device interface that is actively facilitated by the networked computing device when executing the application, but that is not authorized based on said authorizing; and blocking, within the application layer via the API to the device driver interface library, access to a specific one of the hardware device interfaces in direct response to a detected said unauthorized change in the status of the specific one of the hardware device interfaces or to the specific one of the hardware device interfaces not being authorized access based on said authorizing.

2. The computer program product of claim 1, the method further comprising unblocking access to the specific one of the hardware device interfaces upon resolution of the unauthorized change in the status.

3. The computer program product of claim 2, wherein for at least one of the software applications, said method further comprises:

presenting results of said reviewing and said authorizing to a user of the networked computing device through a graphical user interface (GUI) displayed by the networked computing device; and for at least one of the hardware device interfaces, permitting the user to perform said blocking and said unblocking of access through actuation of a graphical switch displayed by the GUI.

4. The computer program product of claim 1, wherein the unauthorized change in the status further includes unauthorized data traffic passing through the hardware device interface to the network.

5. The computer program product of claim 1, wherein said method further comprises:

comparing the application to a list of applications each of which is known to request access to at least one of the hardware device interfaces for malicious purposes; and if the application is part of the list, denying authorization for access to the at least one of the hardware device interfaces known to be requested by the application for malicious purposes.

6. The computer program product of claim 5, wherein said method further comprises if the application is part of the list, deciding whether the application should be permitted to run on the networked computing device.

7. The computer program product of claim 6, wherein for at least one of the software applications, said method further comprises:

presenting results of said comparing, said denying and said deciding to a user of the networked computing device through a graphical user interface (GUI) displayed by the networked computing device; and for at least one hardware device interface of the hardware device interfaces, permitting the user to manually alter the results through actuation of a graphical switch provided by the GUI for controlling access to the at least one hardware device interface for the application.

8. The computer program product of claim 1, wherein the method further comprises performing said reviewing prior to permitting the application to run, at least for a first time, on the computing device.

9. The computer program product of claim 1, the method further comprising:
permitting a user to manually block access to one or more of the hardware device interfaces individually, by actuating a graphical switch that is uniquely assigned to specifically control access to each of the one or more of the hardware device interfaces, the graphical switch for each of the one or more of the hardware device interfaces provided by a graphical user interface (GUI) displayed on the networked computing device; and
permitting the user to manually unblock access to the one or more of the hardware device interfaces by actuating the graphical switch that is uniquely assigned to specifically control access to each of the one or more of the hardware device interfaces.

10. The computer program product of claim 1, the method further comprising:
permitting a user to manually block access to of all the hardware device interfaces together by actuating a single graphical switch that is uniquely assigned to specifically control access to all the hardware device interfaces together, the graphical switch provided by a graphical user interface (GUI) displayed on the networked computing device; and
permitting the user to manually unblock access to all the hardware device interfaces together by actuating the graphical switch that is uniquely assigned to specifically control access to all the hardware device interfaces together.

11. The computer program product of claim 1, the method further comprising permitting a user to manually control whether the application is allowed to run on the networked computing device by actuating a graphical switch provided by a graphical user interface (GUI) displayed on the networked computing device that is uniquely assigned to the application.

12. The computer program product of claim 1, the method further comprising displaying a visual indication of the status, through a graphical user interface (GUI), for each of the hardware device interfaces of the networked computing device.

13. The computer program product of claim 12, the method further comprising issuing a warning in response to the detected unauthorized change in the status of the specific one of the hardware device interfaces, the warning including a change in an appearance of the displayed visual indication of the status for the specific one of the hardware device interfaces.

14. The computer program product of claim 13, wherein the change in the appearance representing the warning includes flashing the displayed visual indication of the status for the specific one of the hardware device interfaces.

15. The computer program product of claim 6, wherein the network includes a server and the networked computing device comprises a plurality of client networked computing devices, the server being in communication with the client networked computing devices over the network in a form of a secure client/server network communications protocol, a user of the server being an administrator of the network, said method further comprising:
presenting results of said comparing, said denying, and said deciding for each of the plurality of client networked computing devices to the administrator through a graphical user interface (GUI) displayed by the server; and
permitting the administrator to manually alter the results through actuation of a graphical switch displayed by the GUI of the server for controlling access to each of the hardware device interfaces for each of the client networked computing devices.

16. The computer program product of claim 1, wherein the network includes a server and the networked computing device comprises a plurality of client networked computing devices, the server being in communication with the client networked computing devices over the network in a form of a secure client/server network communications protocol, a user of the server being an administrator of the network, said method further comprising:
presenting results of said reviewing and said authorizing for each of the plurality of client networked computing devices to the administrator through a graphical user interface (GUI) displayed by the server; and
permitting the administrator to manually alter the results through actuation of a graphical switch displayed by the GUI of the server for controlling access to each of the hardware device interfaces for each of the client networked computing devices.

17. The computer program product of claim 1, wherein the network includes a server and the networked computing device comprises a plurality of client networked computing devices, the server being in communication with the client networked computing devices over the network in a form of a secure client/server network communications protocol, a user of the server being an administrator of the network, said method further comprising:
permitting the administrator to manually block access to one or more of the hardware device interfaces individually for each of the plurality of client networked computing devices by actuating a graphical switch that is uniquely assigned to specifically control access to each of the one or more of the hardware device interfaces for each of the plurality of client networked computing devices, the graphical switch for each of the one or more of the hardware device interfaces provided by a graphical user interface (GUI) displayed on the server; and
permitting the administrator to manually unblock access to the one or more of the hardware device interfaces for each of the client networked computing devices by actuating the graphical switch that is uniquely assigned to specifically control access to each of the one or more of the hardware device interfaces for each of the client networked computing devices.

18. The computer program product of claim 1, wherein the network includes a server and the networked computing device comprises a plurality of client networked computing devices, the server being in communication with the client networked computing devices over the network in a form of a secure client/server network communications protocol, a user of the server being an administrator of the network, said method further comprising:
permitting the administrator to manually block access to all the hardware device interfaces together of each of the plurality of client networked computing devices by actuating a single graphical switch that is uniquely assigned to specifically control access to all the hardware device interfaces together of each of the client networked computing devices, the graphical switch provided by a graphical user interface (GUI) displayed on the server; and
permitting the administrator to manually unblock access to all the hardware device interfaces together for each of the client networked computing devices by actuating the graphical switch that is uniquely assigned to specifically control access to all the hardware device interfaces together for each of the client networked computing devices.

19. The computer program product of claim 1, wherein the network includes a server and the networked computing device comprises a plurality of client networked computing devices, the server being in communication with the client networked computing devices over the network in a form of a secure client/server network communications protocol, a user of the server being an administrator of the network, said method further comprising sending the rules and policies from the server to each of the client networked computing devices over the network.

20. The computer program product of claim 19, wherein the server includes:
   a real-time kernel driver configured to constantly monitor status of controlling interfaces and settings; and
   a rootkit system healer configured to restore one or more security applications in the event a hacker or malicious code tampers with the security applications.

21. The computer program product of claim 19, said method further comprising displaying a visual indication of the status, through a graphical user interface (GUI) on the server, for each of the hardware device interfaces for each of the client networked computing devices.

22. The computer program product of claim 21, said method further comprising presenting to the administrator a summary of real-time events occurring in the client networked computing devices through the GUI of the server.

* * * * *